US009158668B2

(12) United States Patent
Ashok et al.

(10) Patent No.: US 9,158,668 B2
(45) Date of Patent: Oct. 13, 2015

(54) SYSTEM AND PROGRAM PRODUCT TO ALLOCATE AND REALLOCATE CPU RESOURCES NEEDED TO UTILIZE FULL AVAILABLE NETWORK ADAPTER BANDWIDTH CAPACITY FOR LOGICAL PARTITION MIGRATION

(75) Inventors: Rohith K. Ashok, Apex, NC (US);
Agustin Mena, III, Austin, TX (US);
Thuy B. Nguyen, Austin, TX (US); Bret R. Olszewski, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 657 days.

(21) Appl. No.: 13/535,259

(22) Filed: Jun. 27, 2012

(65) Prior Publication Data
US 2014/0007124 A1 Jan. 2, 2014

(51) Int. Cl.
*G06F 9/46* (2006.01)
*G06F 15/173* (2006.01)
*G06F 12/02* (2006.01)
*G06F 9/50* (2006.01)

(52) U.S. Cl.
CPC .............. *G06F 12/02* (2013.01); *G06F 9/5077* (2013.01)

(58) Field of Classification Search
None
See application file for complete search history.

(56) References Cited

U.S. PATENT DOCUMENTS

| 7,539,210 | B2* | 5/2009 | Iovanna et al. | 370/468 |
|---|---|---|---|---|
| 8,095,929 | B1* | 1/2012 | Ji et al. | 718/1 |
| 8,104,036 | B2 | 1/2012 | Olszewski et al. | |
| 8,108,866 | B2 | 1/2012 | Anand et al. | |
| 8,141,083 | B2 | 3/2012 | Olszewski et al. | |
| 8,195,879 | B2 | 6/2012 | Olszewski et al. | |
| 2002/0167967 | A1* | 11/2002 | Jammes et al. | 370/468 |
| 2003/0037092 | A1* | 2/2003 | McCarthy et al. | 709/104 |
| 2004/0168170 | A1* | 8/2004 | Miller | 718/104 |
| 2007/0150894 | A1* | 6/2007 | Barsness et al. | 718/100 |
| 2008/0155537 | A1 | 6/2008 | Dinda et al. | |
| 2008/0235482 | A1* | 9/2008 | Armstrong et al. | 711/173 |
| 2009/0276771 | A1 | 11/2009 | Nickolov et al. | |

(Continued)

FOREIGN PATENT DOCUMENTS

| CN | 102185928 A | 9/2011 |
|---|---|---|
| WO | WO 2010/025127 A1 | 3/2010 |

OTHER PUBLICATIONS

Ko, Youngrok, et al., "A Simulation-Based Migration Manager in Server Virtualization Environments", 2011 First ACIS/JNU International Conference on Computers, Networks, Systems, and Industrial Engineering. IEEE Computer Society (2011). pp. 216-221.

(Continued)

*Primary Examiner* — Abdullah Al Kawsar
*Assistant Examiner* — Jorge A Chu Joy
(74) *Attorney, Agent, or Firm* — Marcia L. Doubet

(57) ABSTRACT

Automated techniques ensure that system central processing unit ("CPU") power is not a bottleneck when migrating logical partitions from one system to another system or systems (e.g., in the event of a system evacuation). CPU resources needed to fully drive available bandwidth during the migration are computed. CPU resources of the system are then adjusted for the migration, which may comprise scaling down the CPU resources that are guaranteed for the executing partitions and/or adjusting relative partition variable weights to limit the amount of excess capacity that can be allocated to a partition.

20 Claims, 5 Drawing Sheets

(56) References Cited

U.S. PATENT DOCUMENTS

2010/0217949 A1  8/2010  Schopp et al.
2011/0051607 A1* 3/2011  Begen ..................... 370/252
2012/0036251 A1  2/2012  Beaty et al.
2012/0102258 A1  4/2012  Hepkin et al.
2014/0006741 A1  1/2014  Ashok et al.

OTHER PUBLICATIONS

Rohith K. Ashok, et al., U.S. Appl. No. 13/767,165, filed Feb. 14, 2013, Office Action, Nov. 20, 2014, 18 pages.

* cited by examiner

SYSTEM AND PROGRAM PRODUCT TO ALLOCATE AND REALLOCATE CPU RESOURCES NEEDED TO UTILIZE FULL AVAILABLE NETWORK ADAPTER BANDWIDTH CAPACITY FOR LOGICAL PARTITION MIGRATION

BACKGROUND OF THE INVENTION

The present invention relates to computer programming, and deals more particularly with automated techniques for ensuring that system central processing unit ("CPU") power is not a bottleneck when migrating logical partitions from one system to another system or systems (e.g., in the event of a system evacuation).

The term "logical partitioning" refers to the ability to make a server run as if it were two or more independent servers. When a server is logically partitioned, the resources on the server are divided into subsets called logical partitions. Processors, memory, and input/output ("I/O") devices are examples of resources that can be assigned to logical partitions. A logical partition runs as an independent logical server with the processor, memory, and I/O resources allocated to it. Examples of software that can be installed and run on logical partitions include the AIX®, i5/OS™, and Linux® operating systems and Virtual I/O Server ("VIOS") software. ("AIX" is a registered trademark, and "i5/OS" is a trademark, of International Business Machines Corporation in the United States, other countries, or both. "Linux" is a registered trademark of Linus Torvalds in the United States, other countries, or both.)

BRIEF SUMMARY OF THE INVENTION

The present invention provides automated techniques for carrying out migration of logical partitions in a computing environment, where this migration may (for example) be triggered responsive to detecting a system evacuation event on a system on which the logical partitions are executing. In one embodiment, the present invention comprises: determining available bandwidth for performing the migration; computing CPU capacity needed for fully using the determined available bandwidth for the migration; responsive to determining that sufficient unallocated CPU capacity is available to meet the computed CPU capacity needed, allocating at least a first portion of the unallocated CPU capacity among the logical partitions and commencing the migration; and responsive to determining that sufficient unallocated CPU capacity is not available to meet the computed CPU capacity needed, allocating the unallocated CPU capacity among the logical partitions, reallocating at least a second portion of the allocated CPU capacity among the logical partitions, and commencing the migration. The migration may comprise moving the logical partitions from a first system on which the logical partitions are executing to a second system on which the logical partitions will execute after the migration, or to a plurality of such second systems.

The allocating of at least a first portion of the unallocated CPU capacity among the logical partitions may comprise allocating an amount of the unallocated CPU capacity that will enable fully using the determined available bandwidth during the migration. The reallocating at least a second portion of the allocated CPU capacity among the logical partitions may comprise reallocating an amount of the allocated CPU capacity that will enable fully using the determined available bandwidth during the migration. Generally, the allocating and reallocating are directed toward scaling down guaranteed CPU resources for executing partitions and/or adjusting relative partition CPU priorities to limit the amount of excess capacity that can be allocated to a partition, with an aim to avoid creating a processor bottleneck in the migration processing.

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

DETAILED DESCRIPTION OF THE INVENTION

Embodiments of the present invention are directed toward carrying out migration of logical partitions of a virtualized system. A virtualized system is one which allows data processing resources to be pooled and shared in a way that shields the physical nature and boundaries of those resources from users. Processors may be virtualized, for example, through shared processor partitioning. An additional layer of software, or firmware, is then placed between the operating system(s) and the hardware to manage the correspondence between the virtual processors and the physical (i.e., actual) processors.

The disclosed partition migration techniques may be particularly useful when the migration is due to a system evacuation—for example, when a first system begins to fail, and its partitions are therefore moved to one or more second systems to attempt preventing an outage for the applications that were executing on the now-failing first system. However, the disclosed techniques may also be used for logical partition migration that is triggered for other reasons. Accordingly, discussions herein that refer to system evacuation should be interpreted as one scenario in which partition migration occurs, and it should be understood that the scope of the present invention is not limited to this scenario.

Virtualization of computing systems provides a number of benefits. As physical systems become more powerful, many resources are available for use by operating systems and applications. Typically, a physical system has more resources than any one operating system and its application program(s) need at a particular point in time. By running a single physical system as if it is multiple virtual machines, some types of system resources can be shared, thereby reducing the effective hardware cost per virtual machine.

Virtualization also allows for portability, whereby a virtual machine can be dynamically moved from a source physical system to a destination physical system, while experiencing substantially no interruption in service. This portability feature may be useful in a number of scenarios, including (by way of illustration but not of limitation) when it is desired to perform maintenance on the source system, to upgrade hardware, to dynamically rebalance processing load across multiple physical system, or to move logical partitions because a failure appears likely on a system on which those logical partitions are executing.

Figure 1:
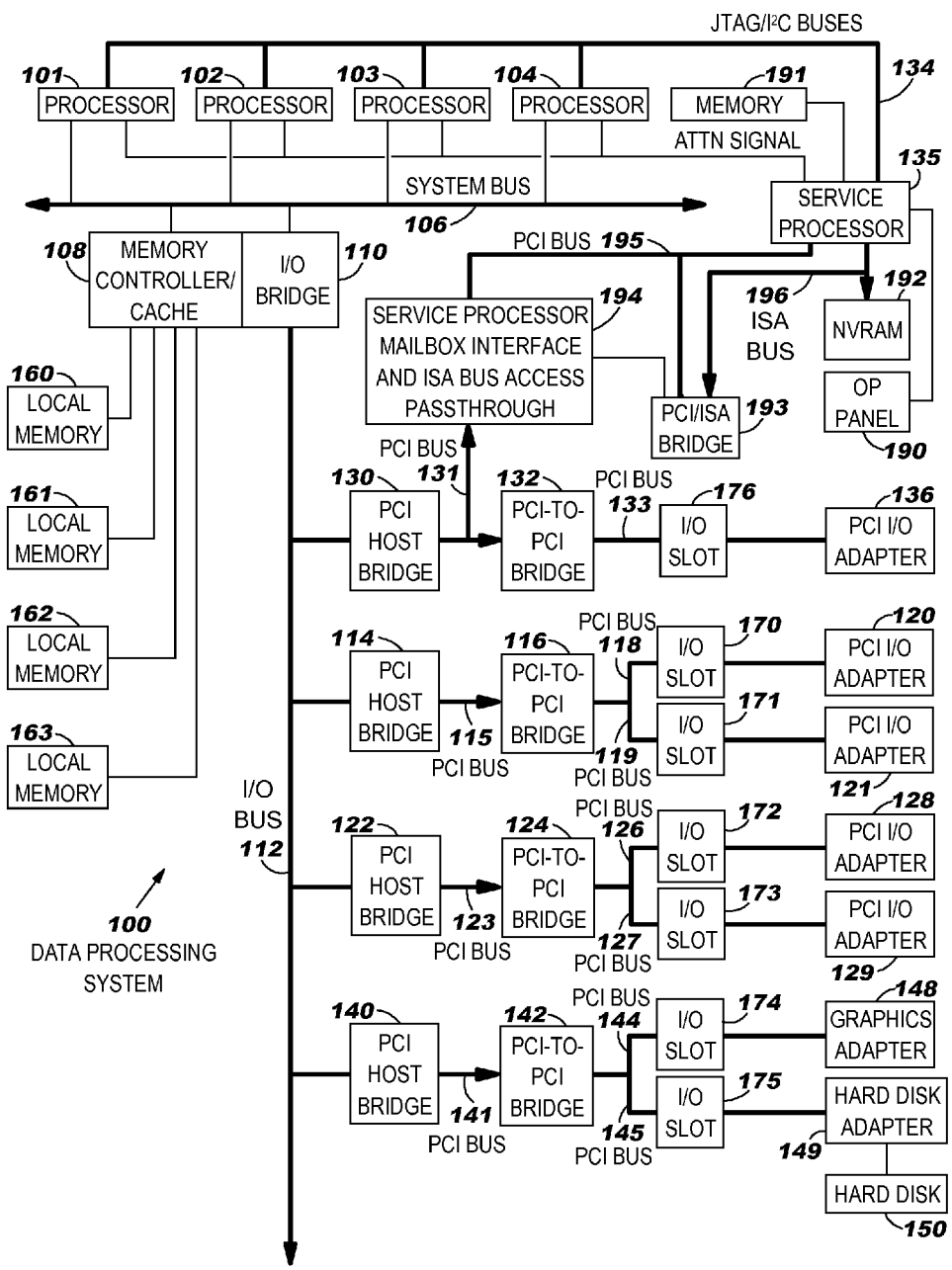
FIG. 1 is a block diagram of a data processing system in which an embodiment of the present invention may be implemented.
Figure 2:
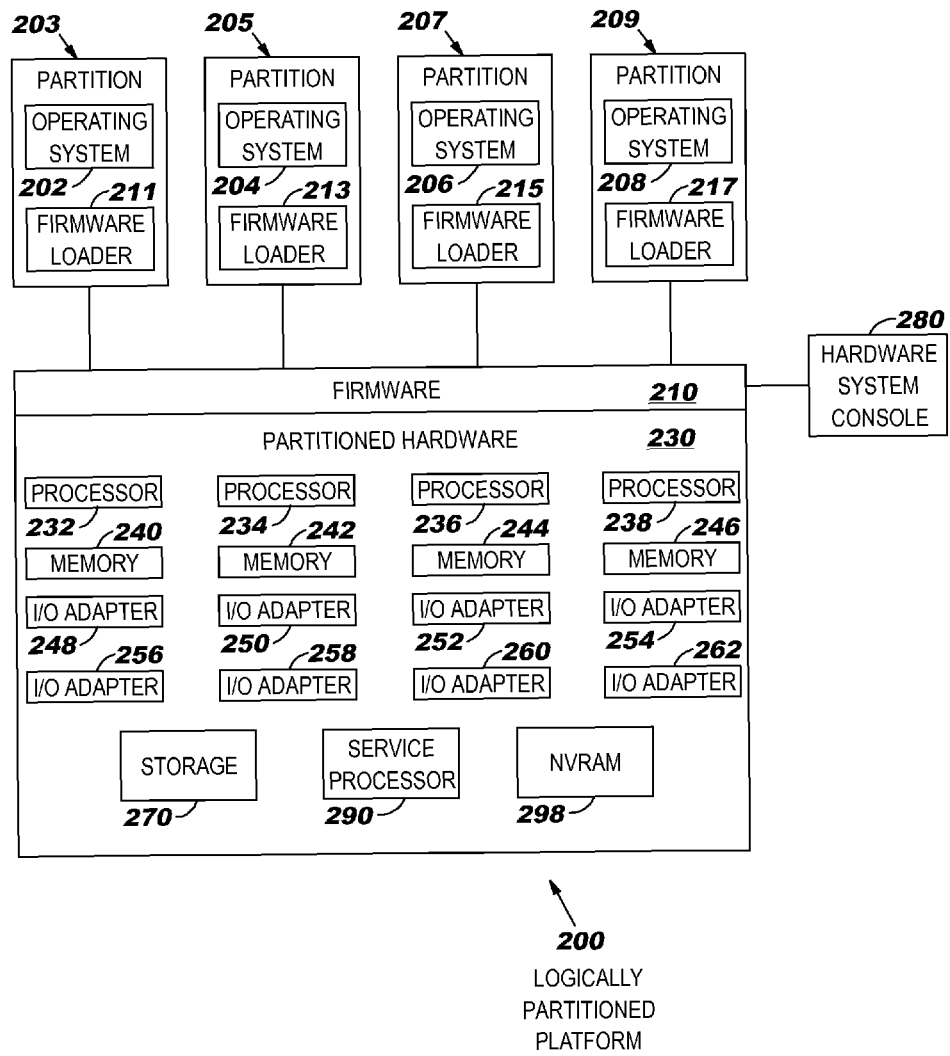
FIG. 2 is a block diagram of a logically partitioned platform in which an embodiment of the present invention may be implemented.

Components of an illustrative virtualized system using shared processor partitioning will now be discussed with reference to FIGS. 1-2. It should be noted that the example computing environments illustrated in FIGS. 1 and 2 are not intended to state or imply any limitation as to the particular types of computing environments in which an embodiment of the present invention may be implemented, and/or to the hardware or other components that may be present in such computing environments. Rather, many modifications to the depicted computing environments may be made without departing from the spirit and scope of the present invention. (Also, it should be noted that references herein to "an embodiment" do not necessarily all refer to the same embodiment.)

FIG. 1 provides a block diagram of a data processing system in which an embodiment of the present invention may be implemented. Data processing system 100 may be a symmetric multiprocessor ("SMP") system including a plurality of processors 101, 102, 103, and 104 connected to system bus 106. For example, data processing system 100 may be an IBM eServer™ data processing system, implemented as a server within a network. ("eServer" is a trademark of International Business Machines Corporation in the United States, other countries, or both.) Alternatively, the plurality of processors may be implemented using one or more multi-core processors (which are discussed in more detail below, with reference to FIG. 4). As yet another alternative, a single processor system may be employed. Also connected to system bus 106 is memory controller/cache 108, which provides an interface to a plurality of local memories 160-163. An I/O bus bridge 110 is connected to system bus 106 and provides an interface to I/O bus 112. Memory controller/cache 108 and I/O bus bridge 110 may be integrated as depicted.

Data processing system 100 is a logically partitioned ("LPAR") data processing system. Thus, data processing system 100 may have multiple heterogeneous operating systems (and/or multiple instances of a single operating system) running simultaneously. Each of these multiple operating systems may have any number of software programs executing within it. The logical partitioning of data processing system 100 allows various resources (such as processors 101-104; peripheral component interconnect ("PCI") I/O adapters 120-121, 128-129, and 136; graphics adapter 148; and hard disk adapter 149) to be assigned to different logical partitions. Graphics adapter 148 may provide a connection for a display device (not shown), while hard disk adapter 149 may provide a connection to control a hard disk 150.

Suppose, for example, that data processing system 100 is divided into three logical partitions which are referred to for purposes of discussion herein as P1, P2, and P3. Each of the above-noted physical or virtual I/O devices, host processors, and local memories, or portions thereof, is assigned to one of the three partitions. For example, at a point in time, logical partition P1 may be assigned to use processor 101, some portion of memory from local memories 160-163, and I/O adapters 120, 128, and 129. At a point in time, logical partition P2 may be assigned to use processors 102-103, some portion of memory from local memories 160-163, and PCI I/O adapters 121 and 136. At a point in time, logical partition P3 may be assigned to use processor 104, some portion of memory from local memories 160-163, graphics adapter 148, and hard disk adapter 149. Although not depicted in FIG. 1, portions of remote memories (not shown) may also be assigned to logical partitions, such as P1 or P2 in the illustrative example.

Each operating system instance executing within data processing system 100 is assigned to a different logical partition. Thus, each operating system instance executing within data processing system 100 may access only those I/O units that are within its logical partition. For example, one instance of the AIX® operating system may be executing within partition P1, a second instance (image) of the AIX® operating system may be executing within partition P2, and a Linux® operating system may be operating within logical partition P3.

A number of PCI host bridges are shown in FIG. 1. See, for example, reference numbers 114, 122, 130, 140. These PCI host bridges are connected to I/O bus 112, and also provide an interface to a corresponding PCI local bus (shown at reference numbers 115, 123, 131, 141). FIG. 1 also shows a number of the above-noted PCI I/O adapters (see reference numbers 120-121, 128-129, 136) being connected to a PCI bus (see reference numbers 118-119, 126-127, 133) which in turn connects to a PCI-to-PCI bridge (see reference numbers 116, 124, 132). Similarly, graphics adapter 148 and hard disk adapter 149 are shown as being connected to PCI local buses 144-145, respectively, which in turn are connected to PCI-to-PCI bridge 142. A number of I/O slots (see reference numbers 170-176) are depicted as being deployed between the adapters and PCI-to-PCI bridges, enabling the adapters to be plugged in and thus connect to the system 100.

Typical PCI bus implementations will support between four and eight I/O adapters (i.e., expansion slots for add-in connectors). Each PCI I/O adapter provides an interface between data processing system 100 and input/output devices such as, for example, various modems or network adapters. In this manner, data processing system 100 allows connections to one or more other data processing systems through a network (not shown in FIG. 1). Notably, these network connections may be used by an embodiment of the present invention to migrate partitions to one or more such other systems upon detecting a system failure in data processing system 100.

Additional examples of devices that may be connected to system 100 through an I/O slot include memory-mapped graphics adapter 148 and hard disk adapter 149 (which in turn provides a connection to hard disk drive 150).

In the example of data processing system 100, a PCI bus 131 provides a connection to a service processor mailbox interface and ISA bus access pass-through logic 194. Service processor mailbox interface and ISA bus access pass-through logic 194 forwards PCI accesses destined to the PCI/ISA bridge 193. Non-volatile random-access memory ("NVRAM") storage 192 is shown as being connected to the ISA bus 196. Service processor 135 is coupled to the service processor mailbox interface and ISA bus access pass-through logic 194 through its local PCI bus 195. Service processor 135 is also connected to processors 101-104 via a plurality of JTAG/I²C buses 134. JTAG/I²C buses 134 are a combination of JTAG/scan buses (see IEEE 1149.1) and Phillips I²C buses. Alternatively, system 100 might use only Phillips I²C buses or only JTAG/scan buses in place of JTAG/I²C buses 134.

All SP-ATTN signals of the host processors 101, 102, 103, and 104 are connected together to an interrupt input signal of the service processor. The service processor 135 has its own local memory 191, and has access to a hardware operations panel 190.

As data processing system 100 is initially powered up, service processor 135 may release host processors 101-104 for execution of code loaded into local memory 160-163. While host processors 101-104 are executing code from respective operating systems within data processing system 100, service processor 135 may enter a mode of monitoring and reporting errors. The type of items monitored by service processor 135 may include, for example, the cooling fan speed and operation, thermal sensors, power supply regulators, and recoverable and non-recoverable errors reported by processors 101-104, local memories 160-163, and I/O bridge 110.

Service processor 135 is generally responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may send a signal that partitions should be evacuated from the processor having the cache memory issues, and this in turn may invoke operation of an embodiment of the present invention.

Those of ordinary skill in the art will appreciate that data processing system 100 may be implemented using various commercially-available computer systems, and that the hardware used in such computer systems may vary widely from the examples depicted in FIG. 1. Furthermore, it will be appreciated that other peripheral devices, such as optical disk drives and the like, may be used in addition to or instead of the peripheral devices depicted in FIG. 1. As example of commercially-available computer systems that may be leveraged by an embodiment of the present invention, data processing system 100 may be implemented using IBM eServer™ i5 or eServer™ p5 server models available from International Business Machines Corporation. Such a system may support logical partitioning using an AIX® operating system or an i5/OS™ operating system which are also available from International Business Machines Corporation.

With reference now to FIG. 2, a block diagram of an exemplary logically partitioned platform 200 is depicted in which an embodiment of the present invention may be implemented. The hardware in logically partitioned platform 200 may be implemented as, for example, data processing system 100 in FIG. 1. Logically partitioned platform 200 includes partitioned hardware 230; operating systems 202, 204, 206, 208; and firmware 210. Operating systems 202, 204, 206, and 208 may be multiple copies of a single operating system or multiple heterogeneous operating systems simultaneously running on platform 200. These operating systems may be implemented, by way of example, using the AIX® operating system, the i5/OS™ operating system, or the Linux® operating system, which are designed to interface with server firmware. In the example of FIG. 2, operating systems 202, 204, 206, and 208 are located in partitions 203, 205, 207, and 209, respectively.

The logical partitions 203, 205, 207, 209 also include firmware loaders 211, 213, 215, and 217, respectively. Firmware loaders 211, 213, 215, and 217 may be implemented using IEEE-1275 Standard Open Firmware and runtime abstraction software ("RTAS"), which is available from International Business Machines Corporation. When partitions 203, 205, 207, and 209 are instantiated, a copy of the open firmware is loaded into each partition by the firmware's partition manager. The processors associated or assigned to the partitions are then dispatched to the partition's memory to execute the partition firmware.

Firmware 210 performs a number of functions and services for partitions 203, 205, 207, and 209 to create and enforce the partitioning of logically partitioned platform 200. Firmware 210 is a firmware-implemented virtual machine identical to the underlying hardware. Hypervisor software is an example of server firmware available from International Business Machines Corporation that may be used as firmware 210. (Firmware may be considered a type of software stored in a memory chip that holds its contents without electrical power, as is readily understood by those of ordinary skill in the art.) Firmware 210 allows the simultaneous execution of independent operating system images 202, 204, 206, and 208 by virtualizing all hardware resources of logically partitioned platform 200.

Operations of the different partitions may be controlled through a hardware management console, such as hardware management console ("HMC") 280. HMC 280 is an example of a hardware appliance that connects to the server firmware 210. The HMC may be used to specify to the server firmware 210 how to allocate resources among the logical partitions on the managed system, start and stop the logical partitions, update server firmware code, manage capacity on demand, and transmit service information to service and support if hardware problems are detected in the managed system. More generally, the server firmware directly controls resource allocations on the server and communications between logical partitions on the server.

HMC 280 is preferably a separate data processing system from system 200, and the functions it provides (including reallocation of resources to different partitions) may be invoked by a system administrator Alternatively, such functions may be provided in a different manner without deviating from the scope of the present invention. For example, Version 5 Release 3 of the above-noted i5/OS™ operating system introduced a Virtual Partition Manager feature that allows one to create and manage several logical partitions from a console session.

Partitioned hardware 230 includes a plurality of processors 232-238, a plurality of system memory units 240-246, a plurality of I/O adapters 248-262, and a storage unit 270. Partitioned hardware 230 also includes service processor 290, which may be used to provide various services such as processing of errors in the partitions, and NVRAM storage 298. Each of the processors 232-238, memory units 240-246, NVRAM storage 298, and I/O adapters 248-262 may be assigned to one of multiple partitions 203, 205, 207, 209 within logically partitioned platform 200, where each of these partitions 203, 205, 207, 209 is executing a corresponding one of operating systems 202, 204, 206, and 208.

As is well known, a processor is a device that processes programmed instructions. When using logical partitioning, the more processors assigned to a logical partition, the greater the number of concurrent operations the logical partition can run at any given time. A systems administrator defines, for each logical partition, how many virtual processors may be utilized by that logical partition. In addition, the systems administrator defines physical processor capacity metrics for the logical partitions. The virtualized processors that are assigned to logical partitions may be dedicated or shared. A dedicated processor is assigned to only one partition at a time, and the entire processing capacity associated with the dedicated processor is therefore available to that partition. A shared processor, on the other hand, may be assigned concurrently to multiple logical partitions. Each fractional share of a shared processor corresponds to an amount of processor capacity that can be used by the logical partition to which that fractional share is assigned at a point in time. (Notably, virtual processors can be shifted among the logical partitions dynamically, depending on where the corresponding processing power is needed at the time.)

The ability to divide the processor capacity (i.e., processing power) of the physical processors of a system and share this capacity among multiple logical partitions is known as "Micro-Partitioning"® or shared processor logical partitioning ("SPLPAR"). ("Micro-Partitioning" is a registered trademark of International Business Machines Corporation in the United States, other countries, or both.) Processors whose processing capacity may be shared among multiple logical partitions are conceptually viewed as being in a shared processor pool. The shared processor pool includes all processors on the server that are not dedicated to specific logical partitions. (That is, dedicated processors are not added to the pool.) Each logical partition that uses the shared processor pool is assigned a specific amount of processor capacity from the shared processor pool. For example, partition 203 of FIG. 2 might be assigned a 0.1 share (i.e., 10 percent of the processor capacity) of a processor while partition 205 is assigned a 1.4 share (effectively representing 100 percent of the capacity of a first processor and 40 percent of the capacity of a second processor).

If a logical partition needs more processor capacity than its assigned amount, the logical partition may—in some cases—use at least a portion of the unused processor capacity in the shared processor pool. An attribute may be associated with each logical partition to specify whether that partition can use more than its assigned amount in this manner. This attribute is referred to herein as the partition being "capped" or "uncapped". A capped partition is capped in the amount of processor capacity it is assigned, and thus only an uncapped partition is eligible for using additional processor capacity from the shared pool. The amount of processor capacity that an uncapped logical partition can use is limited only by the virtual processor settings of the logical partition and the amount of unused processor capacity available in the shared processor pool.

Figure 3:
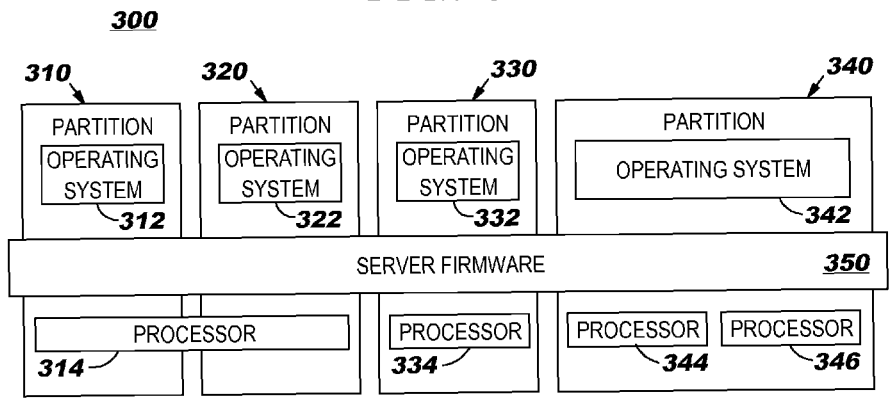
FIG. 3 illustrates an example logically partitioned data processing system with dedicated processors and shared processors.

Referring now to FIG. 3, an example logically partitioned data processing system 300 is illustrated therein, where this data processing system 300 includes both dedicated processors and shared processors. In this example system 300, partition 310 runs operating system 312; partition 320 runs operating system 322; partition 330 runs operating system 332; and partition 340 runs operating system 342. Server firmware 350 may dispatch processor 334 to partition 330, and processors 344 and 346 to partition 340, as dedicated processors. Server firmware 350 may dispatch processor 314 to partitions 310 and 320 from a shared processor pool that includes all processors not assigned as dedicated processors (i.e., all processors except processors 334, 344, 346, in this example).

In the depicted example of FIG. 3, a logical processor may correspond to a whole physical processor or a portion of a physical processor. For example, a logical processor may be a given core of a multiple core processor or a given hardware thread in a multi-threading processor. (Note that the manner in which physical processors are divided into logical processors is not a focus of this disclosure.) As another example, a logical processor may be a time-sliced portion of a physical processor or processing core. For instance, processor 314 may be a single physical processor that is time sliced to form virtual processors for partitions 310 and 320. In this instance, each partition may receive 50 percent of processor 314 time-wise. That is, partition 310 may receive a time slice, after which partition 320 may receive a time slice, and so on.

Figure 4:
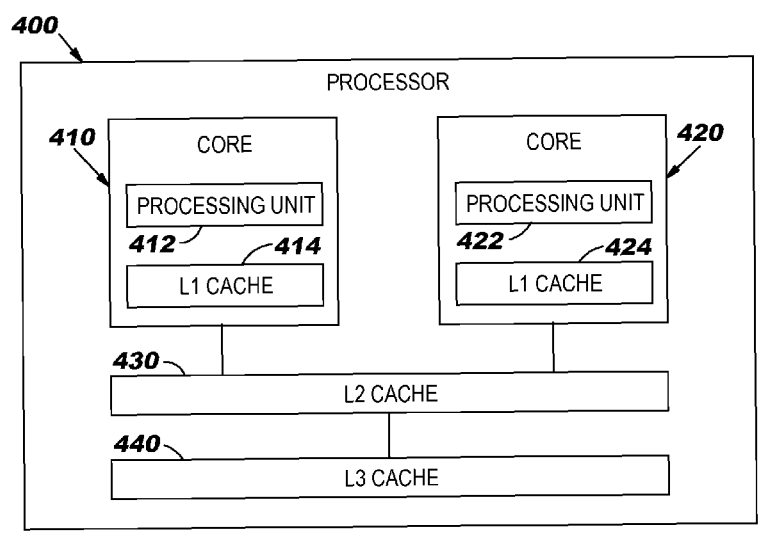
FIG. 4 illustrates an example multiple-core processor which may be used with an embodiment of the present invention.

FIG. 4 illustrates an example multiple core processor 400, which may be used by an embodiment of the present invention. In this example, processor 400 is a dual-core processor that includes core 410 and core 420. Core 410 includes processing unit 412 and level-one (L1) cache 414. Similarly, core 420 includes processing unit 422 and L1 cache 424. In the depicted example, core 410 and core 420 share level-two (L2) cache 430 and level-three (L3) cache 440.

Figure 5:
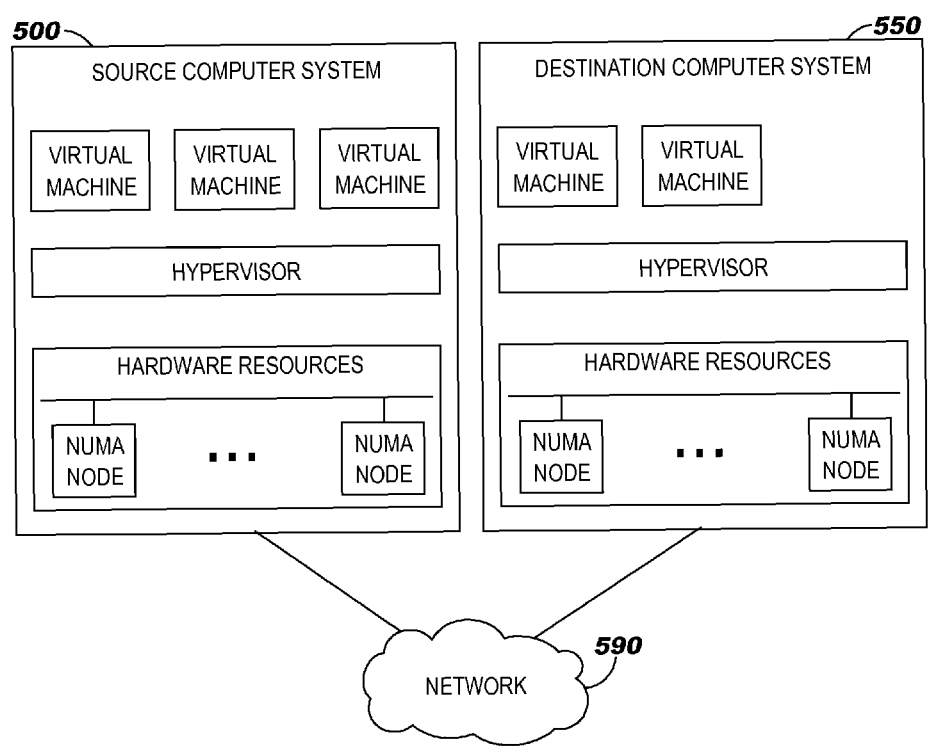
FIG. 5 illustrates interconnection of two computer systems that each provide this type of logical partitioning.

A source physical computer system 500 and a destination physical computer system 550 are shown in FIG. 5, and are illustrative of computer systems that may be involved in a partition migration process that uses techniques disclosed herein. As shown in FIG. 5, source computer system 500 and destination computer system 550 are interconnected by a network 590, which may be a local area network ("LAN"), a wide area network ("WAN"), or a system of interconnected networks. While a single destination system 550 is shown in FIG. 5, it should be understood that this is by way of drafting convenience: in an actual implementation, it may be beneficial to migrate partitions from a single source system 500 to a plurality of destination systems 590. In particular, it is noted that in a system evacuation scenario, the speed of migrating partitions off of a source system 500 is generally a time-sensitive process, and concurrent use of multiple destination systems 590 will typically reduce the likelihood that any one of the destination systems 590 would produce a bottleneck in the evacuation processing.

Figure 6:
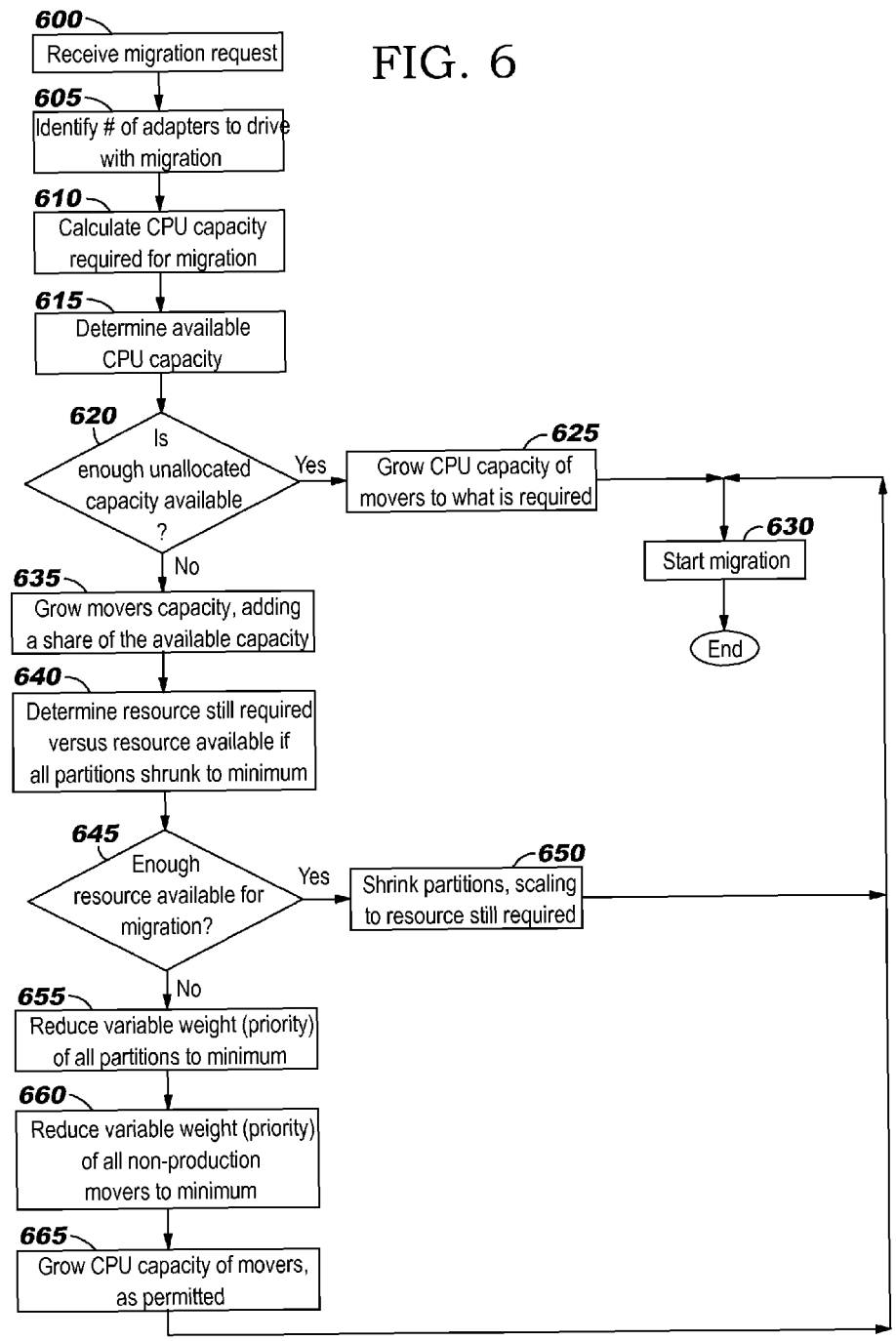
FIG. 6 provides a flowchart depicting logic which may be used when implementing an embodiment of the present invention.

FIG. 6 provides a flowchart depicting logic which may be used when implementing an embodiment of the present invention, as will now be discussed. Moving a partition generally comprises two functions: identifying and storing changes to discrete memory sections, and transferring the memory contents over a network connection. In the prior art, moving partitions from a first system to a second system may be performed using mobility features such as the vMotion™ product from VMware, Inc. ("vMotion" is a trademark of VMware, Inc., in the United States, other countries, or both.) When partition mobility is active, a significant amount of CPU capacity is required by the hypervisor (or other system firmware) to move the partition data. In particular, when the partitions are moved with a sense of urgency during a system evacuation, it is desired to perform the migration at full speed of the network adapters. A system may have multiple 10-gigabit-per-second (10 Gb) Ethernet adapters attached, for example, and supplying enough data to drive all of these adapters at full speed requires a significant amount of CPU capacity.

The CPU capacity of a partition is a function of multiple parameters. In a shared partition processing system, partitions are configured to have an "entitled" or "guaranteed" processor capacity—that is, the partition will get this entire amount of processor capacity if it is required by the partition at a point in time. If the partition is capped, then this entitled processor capacity is also the maximum amount of processor capacity that will be assigned to the partition. As discussed briefly above, an uncapped partition, by contrast, can be assigned more processor capacity than its entitlement. In particular, an uncapped partition (if not limited by virtual CPUs) has the ability to use up to the full amount of processor capacity allocated to the shared processors in the shared processor pool. If there is contention with other uncapped partitions for the processor capacity in the pool, a priority-type attribute associated with each uncapped partition can be used to determine the relative share that will be allocated to the contending uncapped partitions. This priority-type attribute is known as a partition variable weight. Partitions also have a configured minimum amount of processor capacity, which represents the minimum amount that must be allocated to the partition in order for it to start (and if the available processor capacity is less than this minimum when a particular partition attempts to start, it will not start). Partitions may not be reduced below their minimum entitled capacity.

It is possible to enable more capacity for the partition moving infrastructure (such as a VIOS partition) than it requires at a particular point in time, and then allow it to give up time slices on cores when they become idle. However, the POWER® threading model of a PowerVM® system requires all of the threads within a core to be in the same partition at the same time. ("POWER" and "PowerVM" are registered trademarks of International Business Machines Corporation in the United States, other countries, or both.) This has the undesirable side effect of trapping idle time within cores. For example, if a partition's virtual processor has only one software thread active, then the entire core remains dedicated to that partition because there are no other threads that are able to use the resources assigned to the partition. And for partitions that are allocated multiple virtual processors (as illustrated by partition 340 in FIG. 3, for example), it is commonly the case that idle capacity exists in each such virtual processor of the partition. This causes partitions with multiple virtual processors to essentially hoard processor capacity that might be desperately needed by a different partition. Accordingly, it is undesirable to assign a large amount of processor capacity to a partition that cannot effectively use it.

It is noted that some system management tools have attempted to monitor partition resource usage and dynamically adjust resource allocations. However, the previously-existing approaches known to the present inventors perform complex calculations that result in delays on the order of several minutes before adjustments are made, such calculations attempting to avoid undesirable side affects that might result if adjustments were based on short-term temporal observations.

Accordingly, an embodiment of the present invention estimates and adjusts assigned processor capacity in an attempt to allocate enough resource that the partition migration can proceed at maximum speed.

The processing of FIG. 6 is triggered at Block 600 upon receiving a migration request or event notification, which may be due to a system evacuation. The request may be received from a hypervisor—for example, due to an imminent hardware fault, a scheduled system shutdown, or an operation-induced action—or from another component, such as the above-discussed HMC 280 of FIG. 2 or Virtual Partition Manager console.

At Block 605, the number of adapters available for the migration is determined. The maximum potential bandwidth available for migrating partitions can then be determined in view of the throughput of these adapters. As a hypothetical example, suppose that source system 500 of FIG. 5 has connections to 4 different 10 Gb Ethernet adapters. In this example, data for partitions running on source system 500 can be evacuated at a maximum rate of 40 gigabits per second. If source system 500 is connected to only 2 such adapters, on the other hand, then the maximum data transmission rate during an evacuation is 20 gigabits per second.

Block 610 calculates the processor capacity that is required to fully drive the available adapters at full speed. This calculation depends on the particular type and quantity of physical processors operating in the system and their specific processor speeds, as well as the number of partitions to be migrated concurrently. An embodiment of the present invention may leverage an implementation-specific data structure, by way of example, that stores information about the deployed processors and their processor speeds.

Block 615 then determines how much processor capacity is currently available (i.e., unallocated), after which Block 620 tests whether this amount of processor capacity is sufficient. Suppose, merely by way of example, that the network adapters in the system are together capable of transmitting 50*N units of data per second (where N is an illustrative metric), and that the available processor capacity is 100*N units. In this example, the available processor capacity is more than sufficient to fully drive the adapters at maximum speed, and the test at Block 620 will therefore have a positive result. Accordingly, the scaling/adjusting approach disclosed herein is not needed, and control will transfer to Block 625, which grows the capacity of the movers to what is required. That is, Block 625 will move unallocated processor capacity to the partition moving infrastructure that will perform the migration. If there are 5 virtual processors in the scenario where 50*N units of data need to be moved, for example, then Block 625 ensures that these 5 virtual processors are allocated at least enough of the available processor capacity to process 50*N units of data per second. Then migration then proceeds at Block 630, using this allocated processor capacity.

In the case that sufficient unallocated processor capacity is not available, the test at Block 620 has a negative result, and control then reaches Block 635. In a multiple core system, as one example, suppose that there are a total of 64 core and that the calculation at Block 610 determines that at least 2 of these core are needed to fully drive the adapters. Further suppose that only 1 of the core is currently unallocated. An embodiment of the present invention then determines whether another core can be freed up for the migration processing. This preferably comprises first determining whether there is already-allocated processor capacity that exceeds the entitled amount for one or more partitions, such that some of this allocated processor capacity could be scaled back to free up processor capacity for the migration.

Accordingly, Block 635 begins this attempt to gain additional processing power by first growing the capacity of the movers, where this comprises adding at least a share of the available (but insufficient) processor capacity to the movers. (Note that it may be useful, in particular situations, to increase the number of virtual processors associated with the moving, although this has not been illustrated in the figures, to further assist in scaling to the required capacity for the migration.) Block 640 then determines how much additional processor capacity is still required, and how much could be freed up by scaling back the existing partition-specific entitlements to the partition-specific minimum allocation values of each partition. For example, a particular partition might be configured to have an entitlement value of 1.4 virtual processors, and a minimum value of 0.5. Block 640 comprises, in this example, scaling the entitlement value back to 0.5, which will limit the amount of processor capacity that will be automatically allocated to the partition from the shared pool.

Block 645 tests whether this scaling back would free up sufficient processor capacity to fully drive the migration at the maximum throughput of the adapters. If this test has a positive result, then processing continues at Block 650, where the scaling back is performed. In one approach, this scaling back is implemented so that it only reclaims the amount of the processor capacity that is needed (i.e., the difference between the two values computed at Block 640). That is, some partitions may be scaled back to a value higher than their configured minimum. In addition or instead, the scaling back may be omitted for some partitions if the scaling back of other partitions recovers sufficient processor capacity. In an alternative approach, an embodiment may be configured to scale back all partitions to their exact minimums, thereby freeing up a maximum amount of previously-allocated capacity. Following the actual scaling back at Block 650, processing continues at Block 630, where the migration is commenced.

If the scaling back of the allocated processor capacity to the minimum, for all partitions, still would not result in freeing up sufficient processor capacity, then the test in Block 645 has a negative result, and processing continues at Block 655. Note that the scaling back of the entitlements to the minimum values, as discussed above with reference to Block 650, is not performed when following the execution path from Block 645 to Block 655. In an alternative approach, however, the processing of Block 650 may be duplicated in this execution path, in which case it preferably occurs between Blocks 645 and 655.

Upon reaching Block 655, the relative priorities that are configured as the partition-specific partition variable weights will now be used in an attempt to obtain additional processor capacity. (Note that this processing applies only to uncapped partitions, because capped partitions do not use partition variable weights.) Accordingly, Block 655 reduces the partition variable weight values. Preferably, this comprises reducing the partition variable weights of all uncapped partitions to their minimum, which will prevent those partitions from being allocated any share of available processor capacity in the shared pool that would raise the allocation beyond the partition's configured entitlement. Block 660 reduces the partition variable weight of all non-production movers (i.e., partitions that are not doing migration) to their minimum. As a result of the processing of Blocks 655 and 660, some amount of unused capacity will be returned to the shared processor pool, after which Block 665 grows the capacity of the movers in view of the amount of capacity that is now available in the shared pool. Control then transfers to Block 630 to begin the migration process.

Note that it is not necessary to determine whether the capacity returned to the shared pool by Blocks 655 and 660 is sufficient to fully drive the adapter capacity, because the processor capacity that has now been freed up by the processing of FIG. 6 represents the maximum amount that can be freed up in view of the current system conditions. (Thus, it may happen that the adapters will not be driven at their full capacity.)

In an alternative approach, the processing of Blocks 655 and 660 may be performed after a migration has been started. This approach allows the migration to begin more quickly, with the possibility of additional processor capacity becoming available as compared to the amount that is available when migration commences. Because the processing of Blocks 655 and 660 will generally penalize operations on the system that are not within the partitions to be migrated, this processing is preferably omitted except in cases where the migration is performed because of a system evacuation (i.e., when the migration is most time-sensitive).

In view of the disclosures provided above, it can be seen that an embodiment of the present invention attempts to adjust CPU resources of the system to avoid a situation where the system CPU power becomes a bottleneck during the migration process. In summary, this adjustment may comprise (1) scaling down the CPU resources that are guaranteed for individual ones of the partitions and/or (2) adjusting relative priorities that are assigned to individual ones of the partitions for using available CPU capacity from a shared pool.

As will be appreciated by one of skill in the art, embodiments of the present invention may be provided as (for example) methods, systems, and/or computer program products. The invention can take the form of an entirely hardware embodiment, an entirely software embodiment, or an embodiment containing both hardware and software elements. In a preferred embodiment, the invention is implemented in software, which includes (but is not limited to) firmware, resident software, microcode, etc. Furthermore, the present invention may take the form of a computer program product which is embodied on one or more computer-usable storage media (including, but not limited to, disk storage, CD-ROM, optical storage, and so forth) having computer-usable program code embodied therein, where this computer program product may be used by or in connection with a computer or any instruction execution system. For purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory ("RAM"), a read-only memory ("ROM"), a rigid magnetic disk, and an optical disk. Current examples of optical disks include compact disk read-only memory ("CD-ROM"), compact disk read/write ("CD-R/W"), and DVD.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), DVD, an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages such as the "C" programming language or similar programming languages. The program code may execute as a stand-alone software package, and may execute partly on a user's computing device and partly on a remote computer. The remote computer may be connected to the user's computing device through any type of network, including a local area network ("LAN"), a wide area network ("WAN"), or through the Internet using an Internet Service Provider.

Aspects of the present invention are described above with reference to flow diagrams and/or block diagrams of methods, apparatus (systems), and computer program products according to embodiments of the invention. It will be understood that each flow or block of the flow diagrams and/or block diagrams, and combinations of flows or blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram flow or flows and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram flow or flows and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flow diagram flow or flows and/or block diagram block or blocks.

Flow diagrams and/or block diagrams presented in the figures herein illustrate the architecture, functionality, and operation of possible implementations of systems, methods, and computer program products according to various embodiments of the present invention. In this regard, each flow or block in the flow diagrams or block diagrams may represent a module, segment, or portion of code, which comprises one or more executable instructions for implementing the specified logical function(s). It should also be noted that, in some alternative implementations, the functions noted in the flows and/or blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or each flow of the flow diagrams, and combinations of blocks in the block diagrams and/or flows in the flow diagrams, may be implemented by special purpose hardware-based systems that perform the specified functions or acts, or combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A computer-implemented system for migration of logical partitions in a computing system in which the logical partitions share computing resources, comprising:
a computer comprising a processor; and
instructions which are executable, using the processor, to implement functions comprising:
determining available bandwidth of network adapters in the logical partitions that will perform the migration;
computing central processing unit ("CPU") capacity needed for fully using the determined available bandwidth for the migration;
determining an amount of unallocated CPU capacity in a shared processor pool, the shared processor pool representing processors that are shared by the logical partitions;
responsive to determining that sufficient unallocated CPU capacity is available to meet the computed CPU capacity needed, allocating a first portion of the unallocated CPU capacity among the logical partitions that will perform the migration to thereby grow the CPU capacity of the logical partitions that will perform the migration and commencing the migration; and
responsive to determining that sufficient unallocated CPU capacity is not available to meet the computed CPU capacity needed, performing:
allocating the unallocated CPU capacity among the logical partitions that will perform the migration;
reallocating, among the logical partitions that will perform the migration, a second portion of CPU capacity allocated to the logical partitions that will not perform the migration; and
commencing the migration.

2. The system according to claim 1, wherein:
the migration of the logical partitions is triggered responsive to detecting a system evacuation event on a system on which the logical partitions are executing.

3. The system according to claim 1, wherein the reallocating a second portion comprises reallocating an amount of the allocated CPU capacity that will enable fully using the determined available bandwidth during the migration.

4. The system according to claim 3, wherein the second portion is computed as a lesser of an amount that can be unallocated if an entitlement of the logical partitions that will not perform the migration is reduced to its predetermined minimum size and an amount still needed to grow the CPU capacity of the logical partitions that will perform the migration to the computed CPU capacity after allocating an entirety of the allocation of the unallocated CPU capacity.

5. The system according to claim 1, wherein the reallocating a second portion of the allocated CPU capacity comprises:
    determining an amount of the allocated CPU capacity that will become unallocated by shrinking the logical partitions that will not perform the migration;
    computing a sum of currently-unallocated CPU capacity and the CPU capacity that will become unallocated by the shrinking; and
    responsive to determining that the sum is sufficient to meet the computed CPU capacity needed, allocating the currently-unallocated CPU capacity among the logical partitions that will perform the migration, performing the shrinking to unallocate the determined amount of the allocated CPU capacity, and allocating the now-unallocated amount as the second portion.

6. The system according to claim 5, wherein the shrinking shrinks the logical partitions to a configured minimum size.

7. The system according to claim 1, wherein the migration comprises moving the logical partitions from a first system on which the logical partitions are executing to at least one second system on which the logical partitions will execute after the migration.

8. The system according to claim 1, wherein the available bandwidth is determined by summing a throughput capacity of each of a plurality of network adapters that connect a first system on which the logical partitions are executing to at least one second system to which the logical partitions will be migrated.

9. The system according to claim 1, wherein the allocating a first portion comprises allocating an amount of the unallocated CPU capacity that will enable fully using the determined available bandwidth during the migration.

10. The system according to claim 9, wherein the first portion is computed as an amount that will grow the CPU capacity of the logical partitions that will perform the migration from an existing allocated CPU capacity to the computed CPU capacity.

11. A computer program product for migration of logical partitions in a computing system in which the logical partitions share computing resources, the computer program product comprising:
    a non-transitory computer-readable storage medium having computer readable program code embodied therein, the computer-readable program code configured for:
        determining available bandwidth of network adapters in the logical partitions that will perform the migration;
        computing central processing unit ("CPU") capacity needed for fully using the determined available bandwidth for the migration;
        determining an amount of unallocated CPU capacity in a shared processor pool, the shared processor pool representing processors that are shared by the logical partitions;
        responsive to determining that sufficient unallocated CPU capacity is available to meet the computed CPU capacity needed, allocating a first portion of the unallocated CPU capacity among the logical partitions that will perform the migration to thereby grow the CPU capacity of the logical partitions that will perform the migration and commencing the migration; and
        responsive to determining that sufficient unallocated CPU capacity is not available to meet the computed CPU capacity needed, performing:
            allocating the unallocated CPU capacity among the logical partitions that will perform the migration;
            reallocating, among the logical partitions that will perform the migration, a second portion of CPU capacity allocated to the logical partitions that will not perform the migration; and
            commencing the migration.

12. The computer program product according to claim 11, wherein the reallocating a second portion comprises reallocating an amount of the allocated CPU capacity that will enable fully using the determined available bandwidth during the migration.

13. The computer program product according to claim 12, wherein the second portion is computed as a lesser of an amount that can be unallocated if an entitlement of the logical partitions that will not perform the migration is reduced to its predetermined minimum size and an amount still needed to grow the CPU capacity of the logical partitions that will perform the migration to the computed CPU capacity after allocating an entirety of the allocation of the unallocated CPU capacity.

14. The computer program product according to claim 11, wherein the reallocating a second portion of the allocated CPU capacity comprises:
    determining an amount of the allocated CPU capacity that will become unallocated by shrinking the logical partitions that will not perform the migration;
    computing a sum of currently-unallocated CPU capacity and the CPU capacity that will become unallocated by the shrinking; and
    responsive to determining that the sum is sufficient to meet the computed CPU capacity needed, allocating the currently-unallocated CPU capacity among the logical partitions that will perform the migration, performing the shrinking to unallocate the determined amount of the allocated CPU capacity, and allocating the now-unallocated amount as the second portion.

15. The computer program product according to claim 14, wherein the shrinking shrinks the logical partitions to a configured minimum size.

16. The computer program product according to claim 11, wherein the migration of the logical partitions is triggered responsive to detecting a system evacuation event on a system on which the logical partitions are executing.

17. The computer program product according to claim 11, wherein the migration comprises moving the logical partitions from a first system on which the logical partitions are executing to at least one second system on which the logical partitions will execute after the migration.

18. The computer program product according to claim 11, wherein the available bandwidth is determined by summing a throughput capacity of each of a plurality of network adapters that connect a first system on which the logical partitions are executing to at least one second system to which the logical partitions will be migrated.

19. The computer program product according to claim 11, wherein the allocating a first portion comprises allocating an amount of the unallocated CPU capacity that will enable fully using the determined available bandwidth during the migration.

20. The computer program product according to claim 19, wherein the first portion is computed as an amount that will grow the CPU capacity of the logical partitions that will perform the migration from an existing allocated CPU capacity to the computed CPU capacity.

* * * * *